United States Patent Office 3,792,104
Patented Feb. 12, 1974

3,792,104
MANUFACTURE OF ISOPRENE
Herbert Mueller, Frankenthal, Germany, assignor to Badische Anilin- & Soda-Fabrik Aktiengesellschaft, Ludwigshafen (Rhine), Germany
No Drawing. Filed June 21, 1971, Ser. No. 155,241
Claims priority, application Germany, June 27, 1970, P 20 31 921.5; Dec. 16, 1970, P 20 61 803.5
Int. Cl. C07c 1/24
U.S. Cl. 260—681
9 Claims

ABSTRACT OF THE DISCLOSURE

Manufacture of isoprene by dehydration of 3-methyl-3-buten-1-ol with acids comprising treating the 3-methyl-3-buten-1-ol with acids, or substances which form acids in aqueous medium, in the presence of water and salts and, optionally, diluents. The said acids or acid-forming substances and salts are selected so that the anion of the acid and/or the anion of the salt are halides. The isoprene product is isolated.

This invention relates to a new process for the manufacture of isoprene by dehydration of 3-methyl-3-buten-1-ol.

A number of processes for the manufacture of isoprene are already known. For example, the diolefin is prepared industrially by dehydrogenation of isopentene or isopentane. It has also been proposed to manufacture isoprene by dimerizing propylene followed by the removal of methane from the methyl pentene formed. Isoprene may also be produced from isobutene and formaldehyde via 4,4-dimethyl-1,3-dioxane as intermediate. Isoprene may also be obtained by dehydrating 2-methyl-3-buten-2-ol obtained from acetone, acetylene and hydrogen. The said processes are unsatisfactory in many respects. Some of the starting materials used are available only in limited quantities or only via complicated routes, and conversion to isoprene is not sufficiently selective, i.e. it provides inadequate yields. Furthermore, the unsatisfactory purity of the isoprene product is a drawback, particularly in polymerizations using organometallic catalysts.

It is an object of the present invention to provide a process for the manufacture of isoprene in which the starting materials used are readily available.

It is a further object of the invention to provide a process in which the isoprene may be obtained in high yield and purity.

In accordance with the present invention these and other objects and advantages are achieved in a process for the manufacture of isoprene by dehydration of 3-methyl-3-buten-1-ol comprising the treatment of the 3-methyl-3-buten-1-ol with acids, or substances which form acids in aqueous medium, in the presence of water and salts and, optionally, diluents, in which the acids or acid-forming substances and the salts are selected so that the anion of the acid and/or the anion of the salt are halides, followed by isolation of the isoprene product.

The process of the invention produces very pure isoprene in a simple manner and in nearly quantitative yields from a starting material which is readily available from the reaction of isobutene with formaldehyde, as proposed in German Pat. 1,275,049.

It is surprising that this process produces isoprene in such excellent yields, since the literature reveals that 3-methyl-3-buten-1-ol is very difficult to convert to isoprene with acids either in the liquid phase or in the gas phase in contact with fixed-bed catalysts and gives poor yields (cf. Petroleum Chemistry, U.S.S.R., 4 (1965), pp. 211–220 and J. Org. Chem., U.S.S.R., 3 (1968) (8), p. 1328). In these known processes the reaction proceeds very slowly and is accompanied by undesirable side reactions such as hydration and isomerization of the 3-methyl-3-buten-1-ol or decomposition of the alcohol to isobutene and formaldehyde.

Suitable acids for my process are mono- and polybasic inorganic or organic acids having a dissociation constant in water of at least $1 \times 10^{-6}$ such as hydrochloric acid, hydrobromic acid, hydriodic acid, hydrofluoric acid, sulfuric acid, phosphoric acid, formic acid, acetic, p-toluenesulfonic acid, trichloroacetic acid, oxalic acid, maleic acid and ion exchanger resins containing sulfonic acid groups.

Substances forming acids in aqueous medium are, for example, aluminum trichloride, boron trifluoride, titanium tetrachloride and acyl halides such as acetyl chloride.

Mixtures of the acids and/or acid-forming substances may be used if desired. For economical reasons it is preferred to use cheap acids as such.

Since the process of the invention is carried out in the presence of water, the acids ar conveniently used in the form of aqueous solutions. The concentration of the aqueous acids may be varied within wide limits and is preferably between 0.01 and 40% by weight. Very strong acids, i.e. acids having dissociation constants greater than $10^{-1}$ are advantageously used in concentrations of from 0.01 to 20%, in particular from 0.05 to 10%, by weight, and acids having dissociation constants smaller than $10^{-1}$ are advantageously used in concentrations of from 1 to 40% and preferably from 5 to 30% by weight. However, the process may be carried out above or below the acid concentration limits stated above. In general, it is preferred to use lower acid concentrations and higher temperatures and vice versa. Thus it may be convenient, for example, to lower the acid concentration by a factor of from 0.2 to 0.1 when the temperature is raised by, say, 30° C.

Suitable salts are water-soluble salts derived from acids as defined above, i.e. salts derived from acids having dissociation constants of at least $1 \times 10^{-6}$. The salts should be chosen so that where no hydrohalic acid is used, the salt employed is one derived from a hydrohalic acid. Suitable salts are, for example, sodium chloride, potassium bromide, calcium iodide, sodium sulfate, sodium phosphate, calcium chloride, aluminum sulfate, magnesium sulfate, zinc chloride and sodium oxalate. Since almost equally good results are obtained with all of these salts, provided they are used in combination with the appropriate acid, the cheap salts, such as common salt, calcium chloride and Glauber's salt, are preferred for economic reasons. Mixtures of the salts may also be used. A suitable medium in which to carry out the reaction is, for example, sea water.

The upper limit of the concentration of the salts in the aqueous dehydration medium will be set by their solubility at the reaction temperature. This upper limit may be exceeded, however, to avoid dilution of the solution by the water liberated during dehydration. Since the reaction rate falls with increased dilution, the salt content in the acidic aqueous medium should not be less than 3% by weight, although the rate of dehydration even at this low concentration of salt is more than 100 times greater than in the absence of salts.

In the new process the dehydration is carried out at temperatures of up to, say, 140° C. It is convenient to select a temperature which is at least equal to the boiling point of isoprene, i.e. a temperature of from 40° to 100° C. for example when operating under atmospheric pressure. If the process is carried out at subatmospheric or superatmospheric pressure, the temperature range may be extended to from 0° to 140° C. for example. The reaction rate is, of course, lowered by temperature reductions. Since the yield is markedly impaired when the temperature is raised above 100° C., it is preferred to carry out the reaction at atmospheric pressure and at temperatures of from 60° to 100° C.

In many cases, it is advantageous to add diluents to the reaction mixture in order to raise the yield. By diluents we mean liquid organic compounds which are inert under the conditions of dehydration and which boil, conveniently, in the temperature range in which the dehydration is carried out. As suitable diluents there may be mentioned hydrocarbons such as petroleum fractions boiling in the range 50° to 120° C., benzene, toluene, xylene, cyclohexane and methylcyclohexane. Satisfactory results have been obtained by adding such diluents in quantities ranging from 5 to 100% by weight, based on the acidic salt solution.

The new process for the manufacture of isoprene may be carried out batchwise. However, it is advantageous to carry it out continuously. In one advantageous method of continuous operation, the 3-methyl-3-buten-1-ol is fed to a stirred reaction vessel containing the acidic aqueous salt solution and heated at the reaction temperature, the rate of feed being such that the isoprene formed may be removed by condensation in a fractionating column fitted to the top of the reaction vessel. At the same time, the water formed during dehydration is likewise removed continuously from the acidic salt solution, for example by distillation. There is no consumption, or only very slight consumption, of the catalyst consisting of the acidic aqueous salt solution, which remains in the reaction vessel.

In a particularly advantageous embodiment of the process, the isoprene formed is recovered by removing a distillate from the reaction mixture at temperatures between the boiling point of isoprene and the boiling point of the azeotrope leaving the reaction mixture, neutralizing the said distillate if desired and then isolating the isoprene therefrom by fractional distillation. Thus in this embodiment the isoprene is not isolated from the reaction mixture direct, by fractional distillation, but is obtained from a distillate which is removed (by distillation) from the reaction mixture in the temperature range $T_1$ to $T_2$ and which may be neutralized before the isoprene is isolated. $T_1$ is the boiling point of isoprene at the particular pressure employed and $T_2$ is the boiling point (at the same pressure) of the azeotrope leaving the reaction mixture and consisting of dimethylvinyl carbinol and water. Dimethylvinyl carbinol is the lowest boiling isopentenol produced under the catalytic influence of the dehydration catalyst, perhaps as an intermediate.

When operating under atmospheric pressure, $T_1$ is 34° C. and $T_2$ is 86° C. The preferred temperature range for the removal of the distillate is from $T_1$ +5° C. to $T_2$ −10° C. The distillate is conveniently removed via dephlegmator and it may be neutralized, if desired, before it is fractionally distilled for the purpose of producing pure isoprene. The neutralization, if carried out, may be effected with the distillate in a gaseous or liquid state.

Neutralization in the gas phase has the advantage that the neutralized gases may be directly fed, without applying additional energy, to a continuous fractionating column which gives pure isoprene at the top and water and isopentenols at the bottom. The latter products are conveniently recycled to the dehydrator. In this method the temperature in the neutralization stage is at least as high as in the dephlegmator.

Neutralization may be carried out with any base capable of forming a salt with the acids used in dehydration. As examples there may be mentioned ammonia, alkali and alkaline earth metal hydroxides and carbonates, such as sodium hydroxide, sodium carbonate, calcium carbonate, calcium hydroxide, potassium hydroxide, basic ion exchangers and organic bases such as primary, secondary and tertiary amines. With neutralization, the yields are from about 1 to 5% higher than without neutralization.

The advantage gained in the special embodiment of the process is that isoprene is formed from the starting material at a reaction rate which is from 2 to 6 times greater than that occurring in the embodiment in which the isoprene is directly isolated from the reaction by fractional distillation. Thus the volume of reaction medium required for carrying out the synthesis is correspondingly smaller and the process more economical. The increase in the dehydration rate is substantially dependent on the dephlegmator temperature used. The dehydration rate increases with increases in said temperature. At a particularly desirable reaction temperature of from 40° to 60° C. the rate of dehydration is approximately from 2 to 5 times greater than when a fractionating column is fitted to the reaction vessel. The absolute reaction rate is, of course, dependent on the reaction conditions, such as the reaction temperature, catalyst concentration, mixing efficiency and the type of catalyst used.

In the special embodiment of the process small amounts of acid are lost according to the dephlegmator temperature used. However, this is not detrimental to the process, as the acid used is usually cheap hydrochloric acid. At a dephlegmator temperature of, say, 45° C. only about 1 to 2 parts of hydrochloric acid are removed from the dehydrator via the dephlegmator per 1,000 parts of isoprene. This loss may be readily made good in the dehydrator.

Isoprene is an important monomer for the manufacture of polymers and it is a valuable intermediate in the preparation of, say terpenes.

In the following examples the parts are by weight unless otherwise stated. The parts by weight relate to the parts by volume as do kilograms to liters.

EXAMPLE 1

The results given in the following table were obtained using the following experimental outfit:

A stirred cylindrical reaction vessel having a capacity of 4 parts by volume is charged with the acidic salt solution prepared by mixing salt, acid and water. The charge is then heated at from 90° to 95° C. with stirring. The reaction vessel is equipped with a reflux condenser operated at from 40° to 45° C. and a descending condenser which is connected to said reflux condenser and in which the isoprene product condenses. In experiment No. 8, 0.5 part by volume of methylcyclohexane is used in addition to the acidic salt solution. Experiment No. 9 is a comparative test operated in the absence of salt.

3-methyl-3-buten-1-ol is continuously fed to the vessel over the specified period. The charge is held at the reaction temperature for a further 2 hours after the feed of methylbutenol has been stopped, in order to complete the reaction. The yield of isoprene product, which is on average from 94 to 96% pure and contains only some methylbutenol not condensed in the reflux condenser, was determined by gas chromatography.

TABLE

| Experiment number | Water, parts by vol. | Acid (parts) | Salt (parts) | Methylbutenol Parts | Methylbutenol Feed time, hrs. | Isoprene, parts | High-boiling by-products, parts |
|---|---|---|---|---|---|---|---|
| 1 | 0.6 | 35% hydrochloric (0.007) | CaCl₂ (0.3) | 1 | 3 | 0.72 | 0.1 |
| 2 | 0.6 | p-Toluene sulfonic (0.04) | CaCl₂ (0.3) | 1 | 2 | 0.70 | 0.12 |
| 3 | 1.2 | Oxalic (0.2) | NaCl (0.6) | 5 | 10 | 3.7 | 0.4 |
| 4 | 1.2 | 85% phosphoric (0.68) | NaCl (0.4) | 4 | 12 | 2.9 | 0.3 |
| 5 | 1.2 | 35% hydrochloric (0.06) | NH₄Cl (0.5) | 2 | 3 | 1.5 | 0.15 |
| 6 | 1.2 | 35% hydrochloric (0.36) | Na₃PO₄ (0.4) | 4 | 9 | 3.8 | 0.36 |
| 7 | 1.2 | 85% phosphoric (0.08) | NaBr (0.4) | 2 | 8 | 1.5 | 0.15 |
| 8 | 1 | 85% phosphoric (0.06) | NaCl (0.8) | 5 | 11 | 3.8 | 0.43 |
| 9 | 0.6 | 35% hydrochloric (0.007) | | 1 | 3 | 0.001 | |
| 10 | 0.5 | 35% hydrochloric (0.01) | NH₄Cl (0.25) | 1 | 8 | 0.74 | 0.05 |
| 11 | 1.0 | Boron trifluoride di-etherate BF₃·O(C₂H₅)₂ (0.02) | NaCl (0.5) | 2 | 15 | 1.45 | 0.12 |
| 12 | 0.6 | Glacial acetic (0.4) | NaCl (0.3) | 0.425 | 20 | 0.31 | 0.025 |

EXAMPLE 2

A stirred cylindrical reaction vessel having a capacity of 3 parts by volume is charged with an acidic salt solution obtained by mixing 400 parts of sodium chloride, 600 parts of water and 40 parts of 35% hydrochloric acid and is then heated at approximately 95° C. The reaction vessel is equipped with a reflux condenser as dephlegmator, which is operated at 45° C., and with a descending condenser, which is connected to said reflux condenser and which is operated using cooling agent at −10° C. The latter causes condensation of the isoprene product and the isopentenols (consisting of 95% dimethylvinyl carbinol).

0.45 part/hr. of 3-methyl-3-buten-1-ol is metered to the stirred dehydration vessel heated at 95° C. This rate of feed approximately corresponds to the dehydration rate of the system. If the starting compound is added at a greater rate, unreacted 3-methyl-3-buten-1-ol accumulates in the dehydration vessel. The hourly output is about 0.350 part of condensate consisting of 0.33 part of isoprene, 0.01 part of dimethylvinyl carbinol and 0.01 part of water. The aqueous phase is continuously recycled to the dehydration vessel. The organic phase is neutralized with concentrated aqueous sodium carbonate solution and then separated to pure isoprene (0.33 part, purity greater than 99.9%) and isopentenols in a continuous fractionating column having about 9 theoretical plates. The isopentenols (0.01 part) are recycled to the dehydrator.

Aqueous phase is removed from the dehydrator at intervals of 1 hour to keep the liquid at its original level. The common salt and hydrochloric acid thus removed from the system are replenished accordingly. Also at intervals of 1 hour the hourly amount of higher-boiling oligomers formed (about 0.026 to 0.027 part) is removed from the dehydrator. This arrangement gives trouble-free operation over long periods.

I claim:
1. A process for the manufacture of isoprene by dehydration of 3-methyl-3-buten-1-ol which comprises:
   treating said 3-methyl-3-buten-1-ol with an aqueous solution of the components
   (a) an acid having a dissociation constant in water of at least $1 \times 10^{-6}$, and
   (b) a salt derived from an acid having a dissociation constant in water of at least $1 \times 10^{-6}$, at least one of said acid and salt components having a halide anion,
   the acid concentration of said solution being between 0.01 and 40% by weight and the salt content of said solution being not less than 3% by weight; and
   isolating isoprene from the resulting product mixture.

2. A process as claimed in claim 1 wherein the dehydration treatment is carried out at temperatures up to 140° C.

3. A process as claimed in claim 1 wherein the dehydration treatment is carried out at temperatures of about 60° C. to 100° C.

4. A process as claimed in claim 1 wherein the isoprene is recovered from the product mixture by first removing a distillate at temperatures between the boiling point of isoprene and the boiling point of an azeotrope of dimethylvinyl carbinol and water, and then isolating isoprene from said distillate by fractional distillation.

5. A process as claimed in claim 4 wherein the distillate is neutralized prior to isolation of the isoprene by fractional distillation.

6. A process as claimed in claim 1 wherein an inert organic diluent is added in an amount of about 5 to 100% by weight, based on the aqueous acidic salt solution.

7. A process as claimed in claim 6 carried out at a temperature of from 0° C. to 140° C.

8. A process as claimed in claim 6 carried out at about atmospheric pressure and a temperature of about 40° C. to 100° C.

9. A process as claimed in claim 8 carried out continuously by feeding 3-methyl-3-buten-1-ol to the reaction mixture containing the acidic aqueous salt solution maintained at a temperature of about 60° C. to 100° C., and withdrawing the isoprene and water formed during dehydration by distillation from said mixture, said isoprene being condensed in a fractionating column from the resulting distillate.

References Cited
UNITED STATES PATENTS

| | | | |
|---|---|---|---|
| 3,574,773 | 4/1971 | Mueller et al. | 260—681 X |
| 3,657,376 | 4/1972 | Stuebinger et al. | 260—681 |
| 2,478,270 | 8/1949 | Ipatieff et al. | 260—682 |
| 3,696,155 | 10/1972 | Mueller et al. | 260—682 X |

PAUL M. COUGHLAN, JR., Primary Examiner